Aug. 31, 1954

J. R. SMITH 2,687,664

SHAVING TOOL FOR AUTOMATIC SCREW MACHINES

Filed Feb. 10, 1951

INVENTOR.
JOHN R. SMITH,
BY
ATTORNEY.

Aug. 31, 1954
J. R. SMITH
2,687,664
SHAVING TOOL FOR AUTOMATIC SCREW MACHINES
Filed Feb. 10, 1951
2 Sheets-Sheet 2
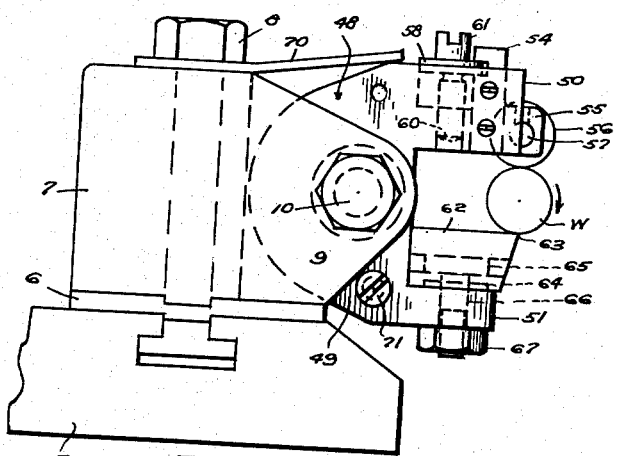
Fig. 8.
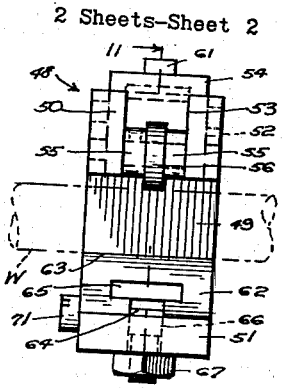
Fig. 9.
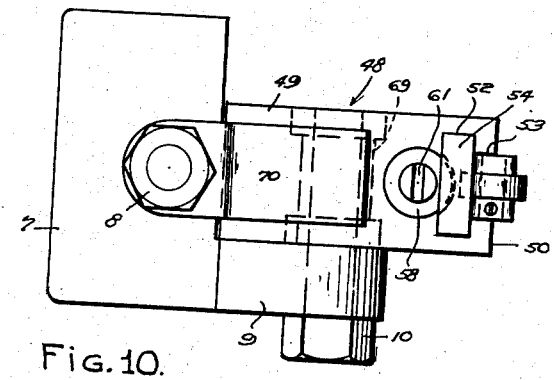
Fig. 10.
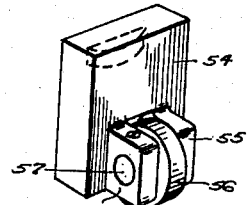
Fig. 12.
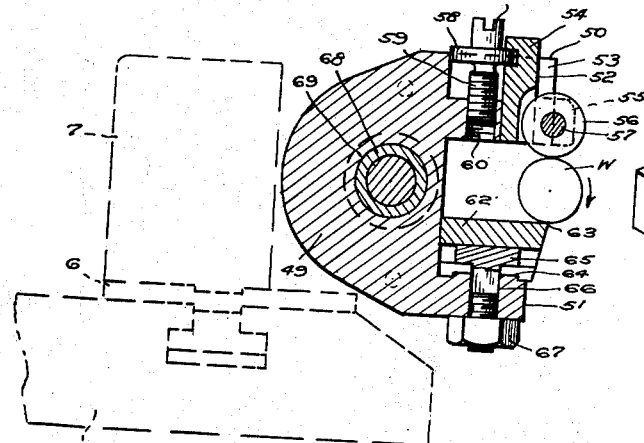
Fig. 11.
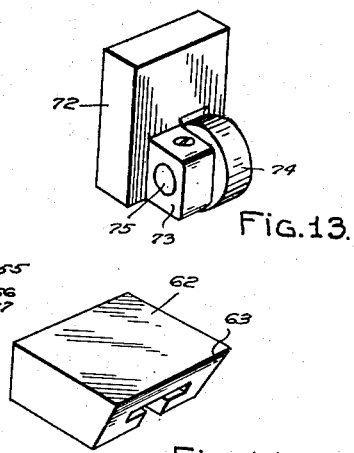
Fig. 13.
Fig. 14.
INVENTOR.
JOHN R. SMITH,
BY
*James h. Lyle*
ATTORNEY.

Patented Aug. 31, 1954

2,687,664

UNITED STATES PATENT OFFICE 2,687,664

SHAVING TOOL FOR AUTOMATIC SCREW MACHINES

John R. Smith, Miami, Fla.

Application February 10, 1951, Serial No. 210,318

1 Claim. (Cl. 82—35)

This invention relates to the art of automatic screw machines and embodies particularly certain novel tool holding means for such machines.

The present improvements are especially adapted for use in conjunction with the well known Brown & Sharpe automatic screw machines, though it will be apparent to those skilled in the art that the structures hereinafter disclosed may be readily adapted to other automatic screw machines of the same general class.

An object of the invention has been to provide improved tool holders involving the use of tools supported in a novel manner for simplicity and accuracy of adjustment and complemented by work supporting members, also quickly and easily adjustable and a special objective achieved by this invention lies in the provisions for the quick adjustment or removal of the said tool or work supporting members and the interchanging of tool members as may be required for different kinds of operations of the automatic screw machine. With the use of the improvements of this invention, the work entailed in adjusting and removing tool blocks or members is greatly reduced, by reason of the provisions for the quick adjustment and removal or interchanging of the tool parts by the employment of this invention under practical conditions of service.

A further object of the invention resides in the provision of tool holding means and work supporting means so constructed that the device can be employed on either the front or rear slide of a screw machine, and wherein the tool may engage over and under the work, which may rotate either forwardly or backwardly.

The invention further contemplates tool holders for detachable mounting on the tool posts of automatic screw machines of either the front or back slide, with the mounting means being such that the holders are reversible in a manner to position the cutting tool either over or under the work and on either the front or back slide and embodies novel bushing means cooperating with the conventional clamping bolt of the tool post.

The invention further contemplates, by minor structural changes, the use of a form shaver and a blade shaver, each being complemental to a rotatable work supporting roller and with the axial center line of the roller being on the direct line of the cutting edge of the blade.

Detailed novel features of construction and operation of both the blade shaver and the form shaver will be more clearly defined in the following description, reference being had to the accompanying drawings, wherein has been illustrated the preferred forms of the device and wherein like characters of reference are employed to denote like parts throughout.

In the drawings:

Figure 1 is a side elevation of a conventional tool post of an automatic screw machine, showing the improved tool holder of the blade shaver mounted thereon, Figure 2 is a front elevation thereof, removed from the tool post, Figure 3 is a transverse vertical section, taken on line 3—3 of Figure 1, Figure 4 is a top plan view of the device of Figure 1, Figure 5 is a vertical longitudinal section, taken on line 5—5 of Figure 4, Figure 6 is a horizontal section, taken on line 6—6 of Figure 5, Figure 7 is a perspective view of a modified form of offset work engaging member employed when shaving narrow shoulders, Figure 8 is a view similar to Figure 1, but illustrating a form shaver, Figure 9 is a front elevation of the structure of Figure 8, with the tool post omitted, Figure 10 is a top plan view of the structure of Figure 8, Figure 11 is a vertical longitudinal section, taken on line 11—11 of Figure 9, Figure 12 is a perspective view of the adjustable work supporting roller of Figure 8, Figure 13 is a perspective view of an offset work supporting roller as employed with the structure of Figure 8, and Figure 14 is a perspective view of a form shaving tool.

Referring specifically to the drawings and particularly to Figures 1 to 7 inclusive, the numeral 5 denotes a conventional cross slide of an automatic screw machine similar to the Brown & Sharpe. The numeral 6 indicates a special raising block substantially half the thickness of the conventional raising block and 7 the conventional tool post, held in adjusted position upon the cross slide by the clamping bolt 8. The tool post 7 is provided with the usual wing extension 9, as is customary and the wing 9 is drilled for the reception of a clamping bolt 10, employed to clamp the tool holder, indicated as a whole by the numeral 11, to the tool post. The tool post as indicated, may be either the forward or rear tool mounting, since the invention is adaptable to either the forward or rear slide.

The structure of Figures 1 to 7 is designed as a blade shaver and its primary purpose is to facilitate the shaving of shoulders and straight bodies back of a head where the conventional box tool cannot be employed. It is also a finishing tool used to hold diameters to close tolerances and eliminating second operational work, such as grinding shoulders to the finished diameters after the piece is dropped off the automatic screw machine.

The tool holder 11 embodies a semi-cylindrical head 12, having flat parallel side walls 13 adapted to be alternately supported against the wing 9, to be determined by the position in which the device is used. The head 12 is provided with upper and lower jaws 14 and 15, spaced apart and parallel with each other. The jaw 15 extends beyond the jaw 14, for a purpose to be described. The jaws are co-extensive in width with the head 12. The jaws are equidistantly spaced above and below the horizontal center line of a concentric opening 16, formed transversely through the head. The opening 16 is counterbored at opposite ends, as at 17 and removably supports a threaded bushing 18, having a head flange 19, seating within either of the counterbores 17. The bushing has threaded engagement with the clamping bolt 10 at assembly and serves to rigidly support the bushing against the wing 9 whereby the tool holder may partake of vertical swinging movement.

The jaw 14, adjacent its outer end, is provided with a vertically arranged rectangular opening 20, extending entirely therethrough. A blade shaving tool 21, rectangular in cross-section, is adapted to traverse the opening 20 and in operative position projects below the under face of the jaw. The blade 21 is bevelled upwardly and rearwardly, providing a cutting edge 22. Rearwardly of the opening 20, the jaw is provided with a relatively large cylindrical opening 23, extending downwardly from the upper face of the jaw to a depth substantially half the thickness of the jaw. The opening 23 partially bisects the opening 20. Concentric to the opening 23 is a threaded cylindrical opening 24, extending through the under face of the jaw. A tool adjusting threaded stud 25, has threaded engagement with the opening 24 and carries adjacent its upper end, a cylindrical collar 26, having a diameter to traverse the opening 23. A slotted head 27 serves to facilitate the rotative adjustment of the stud. The collar 26 engages a slot 28, formed in the rear face of the tool 21 and serves to shift the tool in a vertical plane when the stud is rotated, thus imparting a very fine adjustment to the tool cutting edge 22. Set screws 29 threaded into suitable openings in opposite sides of the jaw 14, serve to rigidly fix the tool 21 after adjustment.

The jaw 15, adjacent its outer end, is provided with a generally square and vertically arranged opening 30, slidably receiving a bifurcated block 31, rotatably supporting a roller 32, upon a cross shaft 33. The roller has a diameter substantially equal to the thickness of the block and projects above the top of the block to serve as a work support and in use, bears against the side of the work at a point diametrically opposite to the point of cutting contact of the tool 21. The forward location of the block 31, positioning the cutting edge 22 of the tool on an exact axial alignment with the roller, is clearly illustrated in Figures 1 and 5. The block 31 is adjustable toward and from the tool 21, under the influence of a threaded stud 34, having threaded engagement in a threaded opening 35 of the jaw 15, that is substantially axially aligned with the opening 24 of the jaw 14. The stud 34 carries a collar 36 and a slotted head 37. The collar has rotative movement in an enlarged cylindrical recess 38, concentric to the opening 35. The collar 36 engages a transverse slot 39, formed in the rear wall of the block 31. It will therefore be apparent, that rotative movement of the stud 34 causes the block and its supported roller 32 to move toward or from the tool 21. As clearly shown in Figures 1 and 5, the contacting parts of the tool 21 and the roller 32, are equidistantly spaced above and below the horizontal center line of the head 12, thus placing the work, indicated at W, on a direct center with the tool holder 11. Set screws 40, threaded in suitable threaded openings of the jaw 15, serve to positively lock the block 31 in adjusted position.

The offset roll 41, illustrated in Figure 7, is employed when it is desired to shave narrow shoulders. The roll 41 is rotatably supported in a side cut-out of a block 42, identical in dimensions to the block 31. The block 42 is provided with slots 43 upon opposite sides for the reception of the collar 36, thus making the block reversible for either a right or left shaving job. The roll 41 is constructed so that the roll is approximately ten thousandths of an inch in from the outside edge of the blade.

The blade shaver so far described, can be used in four different positions, that is, on the front slide with the work spindle running forward or backward or on the back slide with the work spindle running forward or backward. This is possible, since the tool can be reversed by removing the clamping bolt 10, then removing the bushing, turning the holder upside down and reinserting the bushing from the other side and then replacing the clamping bolt 10. Thus, the tool holder is readily reversible so that the cutting edge of the blade 21 will be positioned at all times against the direction of movement of the work spindle. To properly balance the tool holder, a retractile coil spring 44 may be anchored to a suitable bracket 45, upon the tool post at one end, while the opposite end is anchored to a generally L-shaped bracket 46, held upon the head of the tool holder by screws 47. The lower leg of the bracket 46 is slotted, so that the bracket can be shifted to the opposite side of the tool holder, when used on the rear slide. When the tool holder is turned upside down as when being used on the front slide and the spindle is turning in a clockwise direction, the roller will be on top and the blade below. In this position, spring 44 will not be employed and one of the screws 47 replaced in one opening 47' of the head after the bracket 46 is removed and serves to prevent the tool holder from falling down, yet permitting the tool holder to float. A flat spring, similar to that shown in Figure 8, will then be employed, to impart adequate tension on the holder against upward movement, while the screw 47 limits the downward motion.

In the use of this form of the invention, the diameter of the work is determined and the blade and work supporting roller is adjusted in accordance with the particular cut. Once the device is set in position, all fine adjustments are made from the top, regardless of whether you are using the device with the blade or the roller on top. This greatly facilitates the adjustment and the operator is able to accurately judge the necessary adjustment. After adjustment, the tool is employed in the usual manner. The independent adjustment of both the blade and the roller results in considerable saving of a mechanic's time. The blade 21 is readily removed for resharpening and replaced in a minimum of time or a different blade substituted. The offset roller block 42 may be quickly and easily substituted for the center positioned roller 32 when it is desired to shave narrow shoulders.

In the form of the invention illustrated in Figures 8 to 14 inclusive, the same slide 5, raising block 6 and tool post 7, clamping bolt 8, wing 9 and clamping bolt 10 are employed as before. Supported upon the wing 9, through the medium of the bolt 10, is a modified form of tool holder, designated generally by the numeral 48. The tool holder 48 and associated tool and work support have been designed primarily as a form shaver and slight variations of the operation, mounting and the structure have been made from the first form heretofore described.

The tool holder 48, embodies the same semi-cylindrical head 49, provided with forwardly projecting parallel jaws 50 and 51. The jaw 50 adjacent its outer end is provided with a vertically arranged rectangular opening 52 extending entirely through the jaw from top to bottom. The forward end of the jaw is further slotted at 53, with the slot 53 opening into the slot 52. Vertically shiftable in the slots 52 and 53, is a roller block 54, provided with forwardly extending spaced trunnion blocks 55, rotatably supporting a work engaging roller 56, upon a shaft 57. The block 54 is transversely slotted upon its rear face, for the reception of a collar 58, carried by a threaded stud 59, having threaded engagement in a threaded opening 60 of the jaw 50. The upper surface of the jaw 50 is countersunk axially with the opening 60 and rotatably receives the collar 58. A slotted head 61 of the stud serves to rotate the stud in either direction to raise or lower the block 54 through the medium of the engagement of the collar in the slot of the block. Thus, the block 54 and its roller may be adjusted to a fine degree toward and from a cutting tool, to be described. The forward slot 53 provides clearance for the shifting movement of the trunnion blocks 55 and the roller 56 supported thereby.

The lower jaw 51 has a flat upper surface for the seating reception of a cutting tool 62. The tool 62 is co-extensive in width to the jaw 51 and is ground to provide a cutting edge 63. From the cutting edge, the tool is ground downwardly and rearwardly to provide a suitable bevel. On its under side, the tool is slotted in a T-shape throughout its length and slidably receives a key 64, formed upon the upper face of the jaw 51, for accurately aligning the tool with the jaw. A tool clamping device, embodying a flat head 65, slidably engages the wide portion of the slot. The head 65 carries a depending square stud, engaging in a square opening 66, formed through the jaw and the key and serves to prevent turning movement of the head 65. At its outer end, the stud is formed cylindrical and threaded and projects below the lower face of the jaw 51, where it is engaged by a clamping nut 67. The tool is thus rigidly clamped in operative cutting position and may be easily and quickly removed for sharpening or replacement, by merely loosening the nut 67, at which time, the tool can be shifted endwise from the jaw. It will be observed, that the cutting edge 63 is on the direct transverse center line of the roller shaft 57, thus positioning the point of contact of the roller 56 and the cutting edge 63 at diametrically opposite points above and below the work, indicated at W. The head 49 is provided with the same pivotal mounting upon the tool post as described in connection with the first form of the invention and includes the bushing 68, slidably engaging in the opening 69. The head is counterbored as before for the reception of the bushing flange, while the bushing is internally threaded for the reception of the clamping bolt 10.

A tension spring 70 of any desirable form may be secured to the tool post by the bolt 8 and bears against the upper edge of the head 49, while a stop screw 71 carried by the head 49 limits the downward swinging movement of the tool holder. It will be observed, that the work center is directly on the center line of the bolt 10 and in the position shown, the work spindle is rotating in a clockwise direction against the cutting edge 63.

The form shaver just described has been designed to shave the work with different contours or shapes. The roller comes in contact with a straight body on the piece and holds the entire assembly to close tolerances. This tool can be employed on either the front or back slides and can be reversed to position the cutter on top, by simply reversing the bushing, as in the first form of the invention. Thus, the device adapts itself to cutting above or below the work when the spindle rotates in either the clockwise or counterclockwise direction. Since the position of the blade is fixed, the adjustment is made with respect to the roller 56.

In Figure 13, a modified form of offset roller has been illustrated. This form of roller will be provided in both a right and a left hand. The block 72 is identical in shape and size to the block 54, but is provided on its forward face, with a single trunnion block 73, rotatably supporting the roller 74, upon a stub shaft 75.

It will be apparent from the foregoing, that very novel forms of cutting tools have been provided. The blade shaver and the form shaver have been designed for their specific purpose, while in each one, the simplicity of adjustments results in extremely accurate work that has a relatively high finish that requires no further operations. The tool holders and tools are highly flexible as to their various positions of operations and permit the use of the devices in places where the clearance is inadequate for tool holders now in use. The structures are simple, having few and easily adjustable and renewable parts, is strong, durable, cheap to manufacture and highly efficient for the purposes designed.

It is to be understood, that the invention is not limited to the precise construction shown, but that it includes within its purview, whatever changes fairly come within either the spirit or the terms of the appended claims.

Having described my invention, what I claim as new and desire to secure by Letters Patent is:

A tool holder of the character described embodying a semi-cylindrical head having flat parallel side walls for alternate engagement upon the tool posts of either the front or rear slides of automatic screw machines, the tool holder being reversible and invertible upon the tool posts, the head provided with a pair of parallel spaced apart jaws forwardly extending, one jaw having an opening formed therethrough adjacent its outer end and slotted through its end vertically to the opening, a work engaging roller supporting block adapted to traverse the opening, the block provided on its forward side with a pair of spaced parallel trunnion blocks, a work engaging roller rotatably supported in the trunnion blocks with the trunnion blocks and roller traversing the slot and projecting beyond the forward end of the jaw, the roller block provided with a horizontal slot in its rear face, an adjusting screw device having threaded and traverse engagement in openings formed in the jaw, the screw device provided with a collar that engages in the slot of the block, the opposite jaw having a flat inner surface provided with a longitudinal flat upstanding key, the jaw and key being jointly provided with a vertically arranged square opening, a cutter block having its forward end bevelled and sharpened to provide a transverse cutting edge, the block being supported upon the inner surface of the jaw, the cutter block being slotted throughout its length upon its under side for the reception of the key, a clamping device for the cutter block embodying a head for engagement in the slot of the cutter block, a stud carried by the clamping device and projecting through the square opening to be engaged by a clamping nut below the jaw, a pressure spring carried by the tool post and bearing upon the upper part of the tool holder and a stop screw carried by the side of the tool holder to limit the downward swinging movement with respect to the tool post.

References Cited in the file of this patent

UNITED STATES PATENTS

| Number | Name | Date |
| --- | --- | --- |
| 892,130 | Brown | June 30, 1908 |
| 1,243,989 | Schulze et al. | Oct. 23, 1917 |
| 1,375,785 | Drowns | Apr. 26, 1921 |
| 1,751,078 | Drowns | Mar. 18, 1930 |
| 1,820,056 | Drowns | Aug. 25, 1931 |
| 2,041,251 | Klein | May 19, 1936 |
| 2,323,324 | Hanson | July 6, 1943 |
| 2,364,320 | Schlitters | Dec. 5, 1944 |
| 2,412,757 | Smith | Dec. 17, 1946 |

FOREIGN PATENTS

| Number | Country | Date |
| --- | --- | --- |
| 2,438 | Great Britain | Sept. 20, 1906 |
| 181,130 | Great Britain | June 12, 1922 |